US012285851B2

(12) United States Patent
Beer

(10) Patent No.: US 12,285,851 B2
(45) Date of Patent: Apr. 29, 2025

(54) IMPACT MECHANISM FOR A HAMMER TOOL

(71) Applicant: Snap-on Incorporated, Kenosha, WI (US)

(72) Inventor: Joshua M. Beer, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/725,922

(22) Filed: Apr. 21, 2022

(65) Prior Publication Data

US 2023/0339088 A1 Oct. 26, 2023

(51) Int. Cl.
*B25D 11/06* (2006.01)
*B25D 17/06* (2006.01)

(52) U.S. Cl.
CPC ............ *B25D 11/064* (2013.01); *B25D 17/06* (2013.01)

(58) Field of Classification Search
CPC .............................. B25D 11/064; B25D 17/06
See application file for complete search history.

(56) References Cited

U.S. PATENT DOCUMENTS 1,768,718 A * 7/1927 Soderberg ............ B25D 11/064 310/30
4,015,671 A * 4/1977 Borisov ................. B25D 17/24 173/202
5,341,704 A * 8/1994 Klemm ................... B25B 23/14 81/429
5,666,715 A * 9/1997 Zoiss ..................... H05K 13/06 29/566.4
6,796,921 B1 * 9/2004 Buck ....................... B25F 5/001 475/299
6,830,173 B2 12/2004 Barber et al.
8,109,933 B2 2/2012 Truckai et al.
9,545,711 B2 1/2017 Hoop et al.
2004/0108353 A1 * 6/2004 Wolf ......................... B25C 1/08 227/10
2005/0076517 A1 * 4/2005 Steffen ................. B25D 11/064 30/362
2005/0155778 A1 * 7/2005 Ishida ..................... B25F 5/006 173/217

(Continued)

FOREIGN PATENT DOCUMENTS

GB 435416 A 9/1935
GB 713018 A 8/1954

(Continued)

OTHER PUBLICATIONS

United Kingdom Combined Search and Examination Report for corresponding UK Application for GB2305153.5, dated Oct. 4, 2023, 7 pages.

(Continued)

*Primary Examiner* — Andrew M Tecco
*Assistant Examiner* — Nicholas E Igbokwe
(74) *Attorney, Agent, or Firm* — Taft Stettinius & Hollister LLP

(57) ABSTRACT

An impact mechanism for an impact tool that includes a housing, a piston slidably disposed in the housing and adapted to transfer impact force to a tool bit, and electromagnetic coils disposed between the piston and the housing. The electromagnetic coils are alternately activated to generate respective magnetic fields to cause the piston to move within the housing.

25 Claims, 3 Drawing Sheets

(56) References Cited

U.S. PATENT DOCUMENTS

| | | | | |
|---|---|---|---|---|
| 2005/0194420 | A1* | 9/2005 | Zahner | B25C 1/06 173/117 |
| 2008/0073091 | A1 | 3/2008 | Lindsay | |
| 2008/0252150 | A1* | 10/2008 | Grundl | H02K 33/16 310/12.24 |
| 2010/0032468 | A1* | 2/2010 | Gross | B25C 1/06 227/156 |
| 2010/0084451 | A1* | 4/2010 | Abla | B25C 1/00 227/107 |
| 2010/0236802 | A1 | 9/2010 | Berger et al. | |
| 2011/0011607 | A1* | 1/2011 | Gumpert | B25D 11/064 173/112 |
| 2013/0333909 | A1* | 12/2013 | Binder | H02K 33/12 173/117 |
| 2013/0333911 | A1* | 12/2013 | Binder | H02K 33/12 173/212 |
| 2014/0202724 | A1 | 7/2014 | Moore et al. | |
| 2020/0141064 | A1 | 5/2020 | Benjamin et al. | |
| 2021/0031349 | A1 | 2/2021 | Fan et al. | |
| 2021/0154806 | A1 | 5/2021 | White et al. | |
| 2022/0105618 | A1 | 4/2022 | Schlegel et al. | |

FOREIGN PATENT DOCUMENTS

| | | | | |
|---|---|---|---|---|
| JP | 2002059372 | A | 2/2002 | |
| RU | 2726336 | C1 * | 7/2020 | B25D 11/064 |
| WO | 8802666 | A1 | 4/1988 | |

OTHER PUBLICATIONS

Taiwan Office Action for corresponding TW Application No. 112114577, dated Dec. 13, 2023, 11 pages.

Australian Patent Office, Examination Report No. 2 issued in corresponding Application No. 2023202341, dated Oct. 10, 2024, 4 pp.

Taiwan Patent Office, First Office Action issued in corresponding Application No. 113111411, dated Nov. 12, 2024, 13 pp.

* cited by examiner

IMPACT MECHANISM FOR A HAMMER TOOL

TECHNICAL FIELD

The present application relates generally to impact mechanisms for powered hammer tools, and more particularly to an electromagnetic impact mechanism for a powered hammer tool.

BACKGROUND

A variety of powered hammer tools, such as, for example, nail guns, demolition hammers, jack hammers, rotary hammers, auto hammers, impact hammers, etc. are commonly used to apply repetitive force to a tool bit, such as, for example, a hammer bit, or fastener, such as, for example, a nail. The force delivered to the tool bit can be used to break up stone, cut through metal, or shape metal, for example. One such tool, known as an air hammer, is commonly used to break up and/or cut metal and/or stone.

Air hammers typically use compressed air to power a piston that creates an impacting force that is imparted to a tool bit designed for chiseling, cutting, and/or shaping metal, stone or other materials. These air hammer tools require a continuous supply of compressed air to operate. Accordingly, these tools are limited for use in worksites with a constant supply of compressed air.

Another tool used to deliver force to a tool bit is a nail gun. While this conventional tool utilizes an impact mechanism that can be driven by a battery powered motor, the impacting mechanism in these tools does not provide sufficient impact force to chisel, cut, and shape metal, stone or other materials, like an air hammer can.

Other conventional tools utilize an electric powered impact mechanism to deliver force to tool bits. While these tools utilize battery powered motors, the impact mechanisms also fail to deliver enough impact force to chisel, cut, and shape metal, stone or other materials.

SUMMARY

The present invention relates broadly to an impact mechanism for an electromagnetic hammer tool powered by electricity via an external power source (such as a wall outlet and/or generator outlet) or a battery, such as, for example, an 18 V battery. The impact mechanism includes a piston driven by forcing and returning electromagnetic coils to repeatedly impact a hammer bit. The piston includes a non-magnetic spacer disposed at an end of the piston that is adapted to impact the hammer bit. The non-magnetic spacer reduces residual magnetization of the piston and/or hammer bit to restrict the piston from sticking to the hammer bit, reduces the magnetic flux that travels around the inactive forcing electromagnetic coil, which increases a force generated by the return electromagnetic coil to pull the piston away from the hammer bit, and decreases magnetic reluctance (also referred to as magnetic resistance) through the piston and impact mechanism housing and the resistance reduction of the electromagnetic coils, which increases a magnetic force that drives the piston to impact the hammer bit.

In an embodiment, the present invention broadly comprises an impact mechanism for an impact tool. The impact mechanism includes a housing, a piston slidably disposed in the housing and adapted to transfer impact force to a tool bit, and forcing and returning electromagnetic coils disposed between the piston and the housing. The forcing and returning electromagnetic coils are alternately activated to generate a respective magnetic fields to cause the piston to move.

In another embodiment, the present invention broadly comprises an impact tool having a housing adapted to couple with a tool bit via a tool bit holding mechanism and an impact mechanism disposed in the housing. The impact mechanism includes an impact mechanism housing, a piston slidably disposed in the impact mechanism housing and adapted to transfer impact force to the tool bit, and forcing and returning electromagnetic coils disposed between the piston and the impact mechanism housing. The forcing and returning electromagnetic coils are alternately activated to generate a respective magnetic fields to cause the piston to move.

In another embodiment, the present invention broadly comprises an impact hammer including a housing adapted to couple with a tool bit via a tool bit holding mechanism and an impact mechanism disposed in the housing. The impact mechanism includes an impact mechanism housing, a piston slidably disposed in the impact mechanism housing and adapted to transfer impact force to the tool bit, forcing and returning electromagnetic coils disposed between the piston and the impact mechanism housing, and a sleeve disposed between the piston and the forcing and return electromagnetic coils. The forcing and returning electromagnetic coils are alternately activated to generate a respective magnetic fields to cause the piston to move.

In another embodiment, the present invention broadly comprises an impact mechanism for an impact tool with a housing. The impact mechanism includes a piston slidably disposed in the housing and adapted to transfer an impact force to a tool bit, and first, second, and third electromagnetic coils disposed between the piston and the housing. The first, second, and third electromagnetic coils are alternately activated to generate respective magnetic fields to cause the piston to move.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
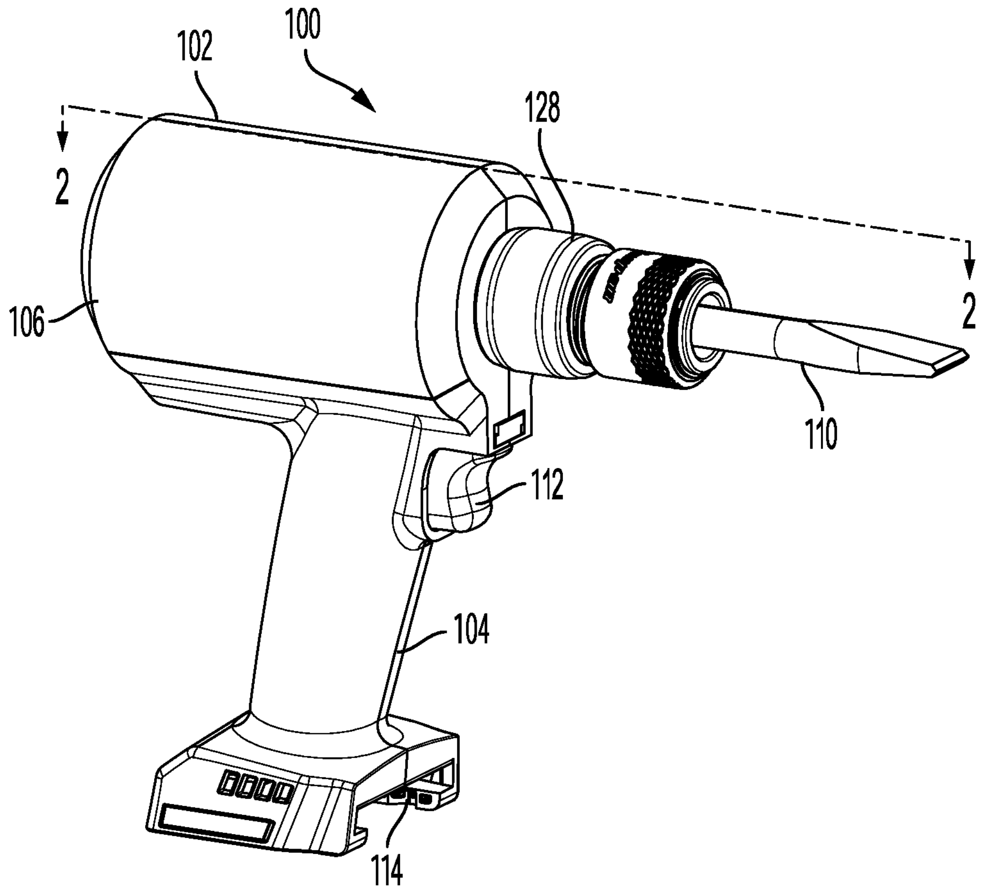
FIG. 1 is a perspective view of an exemplar hammer tool, incorporating an impact mechanism according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to an impact mechanism for an electromagnetic hammer tool powered by electricity via an external power source (such as a wall outlet and/or generator outlet) or a battery, such as, for example, an 18 V battery. The impact mechanism includes a piston driven by forcing and returning electromagnetic coils to repeatedly impact a conventional hammer bit. The piston includes a non-magnetic spacer disposed at an end of the piston adapted to impact the hammer bit. The non-magnetic spacer reduces residual magnetization of the piston and/or hammer bit to restrict the piston from magnetically sticking to the hammer bit, reduces the magnetic flux that travels around the inactive forcing electromagnetic coil, which increases a force generated by the return electromagnetic coil to pull the piston away from the hammer bit, and decreases magnetic reluctance (also referred to as magnetic resistance) through the piston and impact mechanism housing and the resistance reduction of the electromagnetic coils, which increases a magnetic force that drives the piston to impact the hammer bit.

Figure 2:
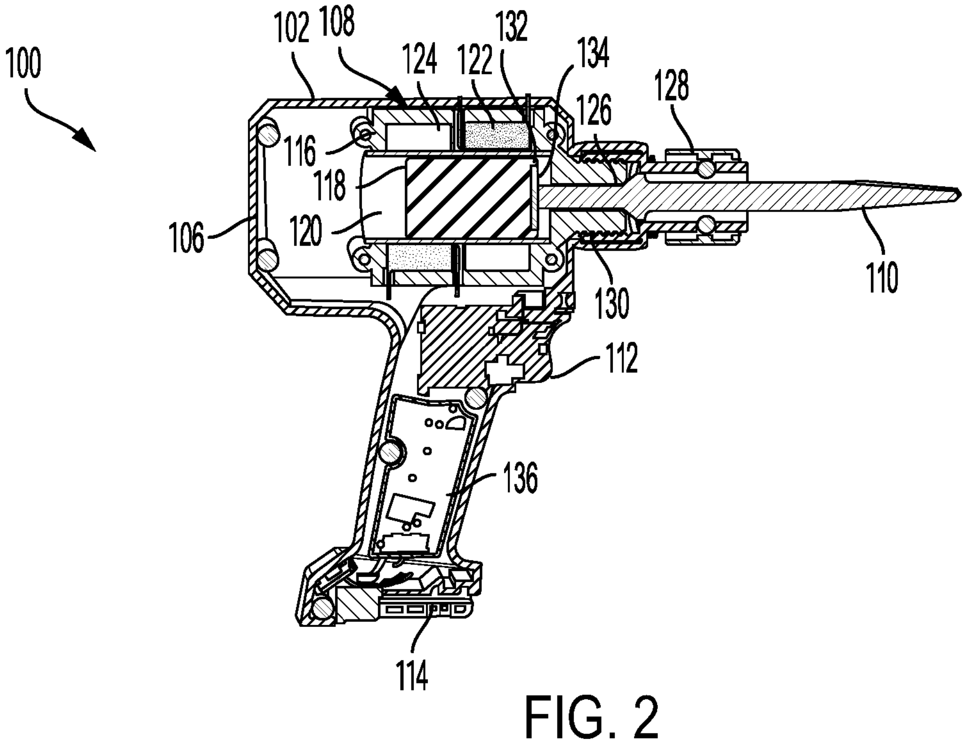
FIG. 2 is a sectional view of the exemplar hammer tool of FIG. 1 taken along line 2-2 of FIG. 1.
Figure 3:
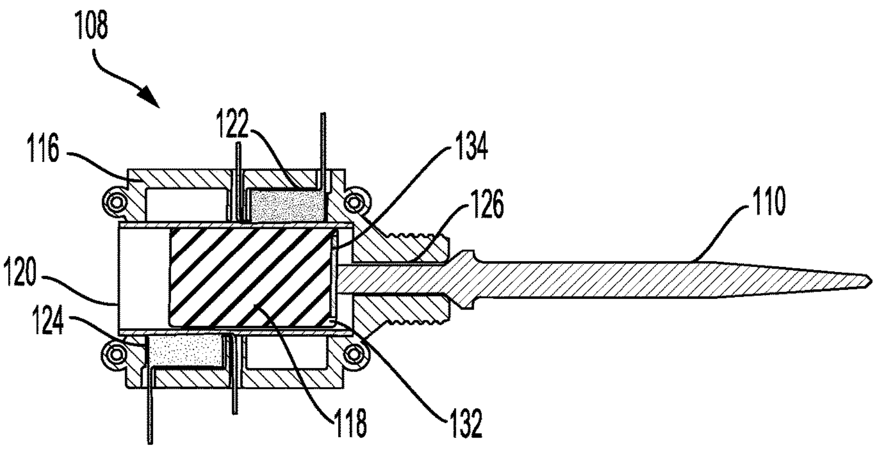
FIG. 3 is a sectional view of an embodiment of an impact mechanism for use with the exemplar hammer tool of FIG. 1.

Referring to FIGS. 1-3, an example impact tool 100, such as, for example, a battery powered impact hammer tool, for use with the present invention is shown. The impact tool 100 includes a housing 102 with a handle portion 104 and an impact housing portion 106. An impact mechanism 108 is disposed in the impact housing portion 106. The housing 102 may include or be coupled to a tool bit 110, using any known tool bit holding mechanism 128, designed, for example, for chiseling, cutting, and shaping metal, stone, or other material, in a known manner for use with tools, such as, for example, a chisel, cutter, scraper, punch, hammer, etc. Alternately, the impact tool 100 is a nail gun. In this embodiment, the housing 102 includes a fastener holder (not shown) such that the impact mechanism can transfer impact forces to a fastener, such as, for example, a nail.

A trigger 112 for controlling operation of the impact tool 100 is disposed on the handle portion 104 in a known manner. Depression of the trigger 112 causes the impact mechanism 108 to repeatedly impact the tool bit 110, as described below. In an embodiment, the impact tool 100 is powered by a battery (not shown), such as a rechargeable battery, which may be detachably mountable at a battery interface 114 of the housing 102. In an embodiment, the battery is an 18 V rechargeable battery.

The impact mechanism 108 includes an impact mechanism housing 116 that encloses a piston 118, a sleeve 120, and forcing 122 and return 124 electromagnetic coils. The impact mechanism 108 transfers impact force to the tool bit 110 upon actuation of the trigger 112, as described below.

In an embodiment, the impact mechanism housing 116 is made from a ferrous material, such as steel, but the invention is not limited as such and any suitable material may be used. The impact mechanism housing 116 includes an opening 126 adapted to receive the tool bit 110 to allow the piston 118 to impact the tool bit 110 to transfer force thereto. In another embodiment, the impact mechanism housing 116 includes a threaded portion 130 adapted to threadably couple to the tool bit holding mechanism 128.

The piston 118 is slidably disposed in the impact mechanism housing 116, and/or the sleeve 120. In an embodiment, the piston 118 is made from ferrous materials, such as steel, but the invention is not limited as such and any suitable magnetic material may be used. An end 132 of the piston 118 includes a non-magnetic spacer 134, such as, for example, a washer or a puck. The non-magnetic spacer 134 may be pressed and/or attached to the piston 118 using an adhesive. In an embodiment, the non-magnetic spacer 134 is made from titanium, but the invention is not limited as such and any suitable non-magnetic material may be used. The non-magnetic spacer 134 functions as an insulator that decreases residual magnetization of the piston 118 and/or tool bit 110 that make separation of the piston 118 from the tool bit 110 difficult. The non-magnetic spacer 134 also reduces the magnetic flux that travels around the inactive forcing coil 122, thereby increasing the force the return coil 124 generates to pull the piston 118 away from the tool bit 110.

The sleeve 120 surrounds the piston 118 and is disposed between the piston 118 and the forcing 122 and return 124 electromagnetic coils. The sleeve 120 is constructed of a non-magnetic material. The sleeve 120 functions as a bearing surface for the piston 118. In an embodiment, the sleeve 120 is constructed of a synthetic thermoplastic polymer, such as, for example, a nylon composite material. However, the invention is not limited as such and any suitable non-magnetic material may be used.

The forcing 122 and returning 124 electromagnetic coils are alternately activated to generate respective opposing magnetic fields to cause the piston 118 to move towards or away from the tool bit 110. The forcing 122 and returning 124 electromagnetic coils are disposed around the sleeve 120 and the piston 118. When the returning electromagnetic coil 124 is activated and the forcing electromagnetic coil 122 is deactivated, the piston 118 is caused to move away from the tool bit 110. When the forcing electromagnetic coil 122 is activated and the returning electromagnetic coil 124 is deactivated, the piston 118 is caused to move towards the tool bit 110 to deliver an impact force thereto.

Figure 4:
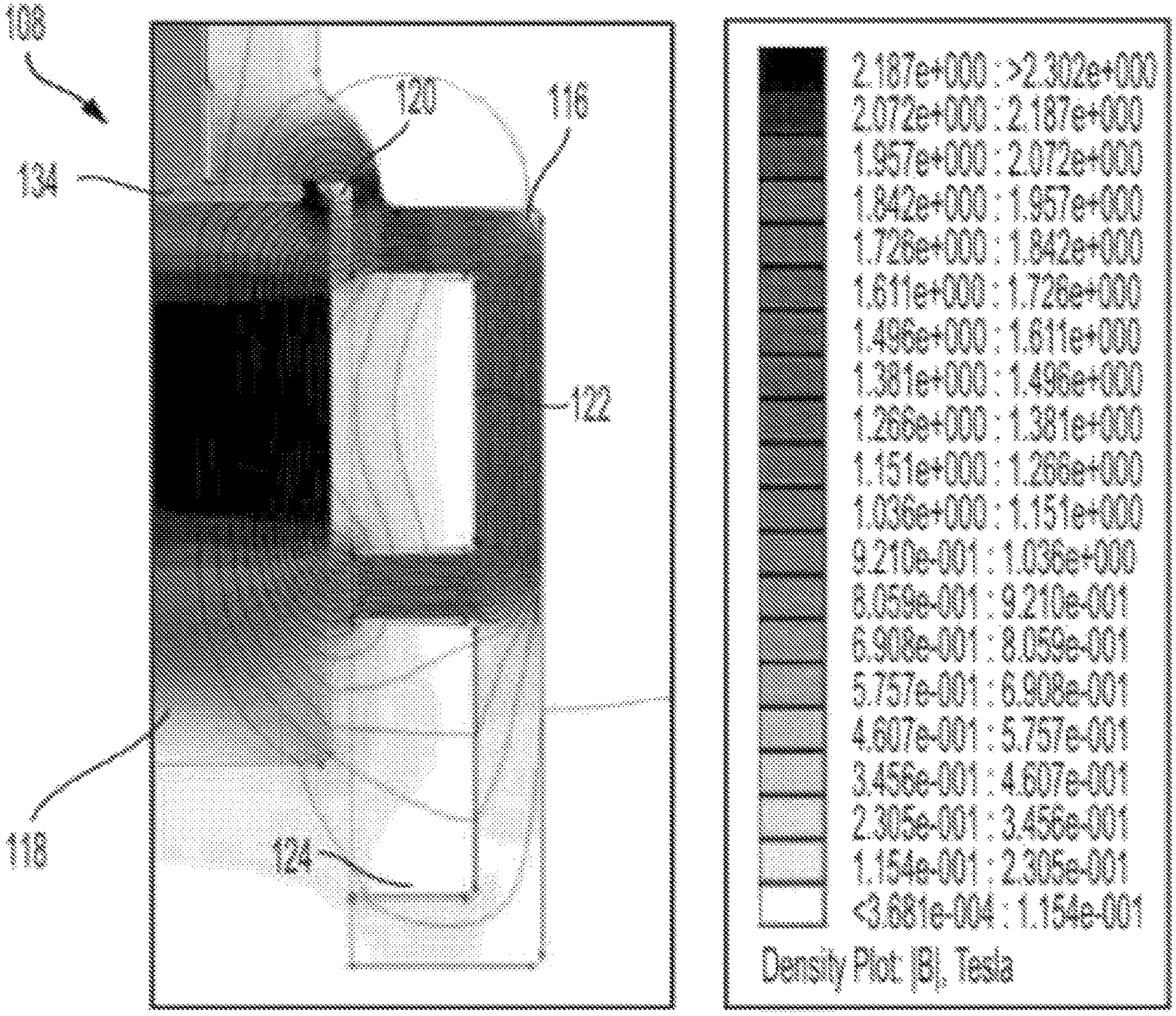
FIG. 4 is an example magnetostatic flux density plot of the exemplar hammer tool of FIG. 1 when using an embodiment of the present invention.

In an embodiment, the piston 118 has an outside diameter in a range of about 21 mm to 34 mm, the impact mechanism housing 116 has an outside diameter is in a range of about 68 mm to 72 mm, and the forcing 122 and returning 124 electromagnetic coils each has an inside diameter in a range of about 27 mm to 37 mm. Preferably, the piston 118 outside diameter is about 33.19 mm, the impact mechanism housing 116 outside diameter is about 72 mm, and the forcing 122 and return 124 electromagnetic coils inside diameters are about 37 mm. An impact mechanism 108 according to an embodiment of the present invention has reduced magnetic reluctance and flux density and increased magnetic force. The impact mechanism 108 according to an embodiment produces about 2,500 pounds of force (e.g., lbf) at 3,000 impacts per minute to the tool bit 110. Moreover, the number of coil windings of the forcing 122 and returning 124 electromagnetic coils is about 100, and more preferably about 112, which decreases the resistance of the electromagnetic coils. FIG. 4 illustrates a magnetostatic flux density plot of an embodiment of the impact mechanism 108 at position zero (i.e., the piston 118 is contacting the tool bit 110). In this plot, the sleeve 120 and non-magnetic spacer 134 are modelled as air gaps.

Figure 5:
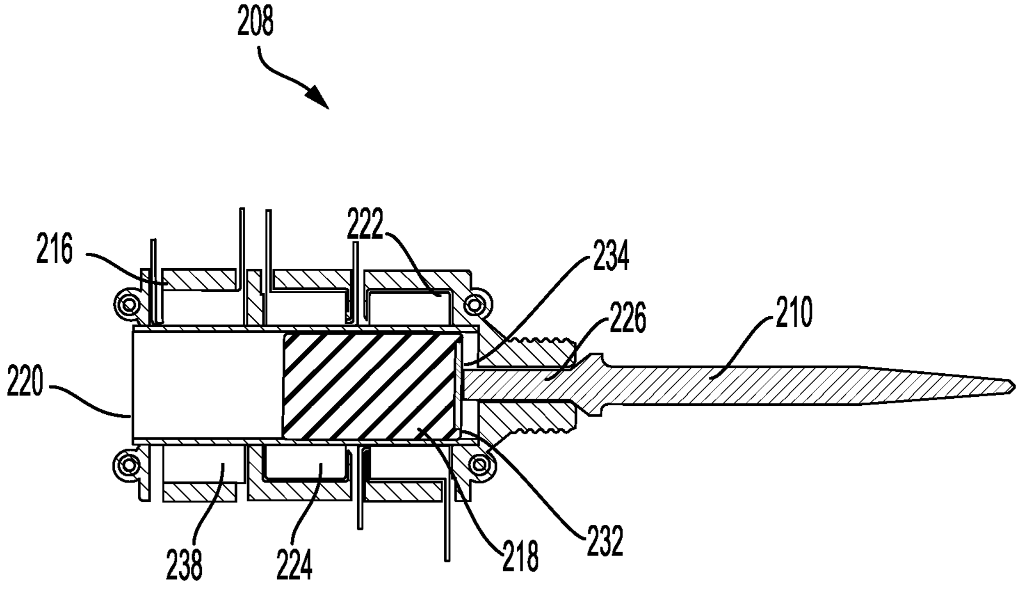
FIG. 5 is a sectional view of another embodiment of an impact mechanism for use with the exemplar hammer tool of FIG. 1.

In another embodiment, as illustrated in FIG. 5, an impact mechanism 208 is disposed in the impact housing portion 106 and depression of the trigger 112 causes the impact mechanism 208 to repeatedly impact the tool bit 110. The impact mechanism 208 includes an impact mechanism housing 216 that encloses a piston 218, a sleeve 220, and first 222, second 224, and third 238 electromagnetic coils. The impact mechanism 208 is substantially similar to the impact mechanism 108 described above, except three electromagnetic coils are used to move the piston 218 to deliver impact force to the tool bit 210.

The impact mechanism housing 216 and opening 226 are substantially the same as the impact mechanism housing 116 and opening 126 described above.

The piston 218 and sleeve 220 are also substantially the same as the piston 118 and sleeve 120 described above. Similar to the piston 118 described above, an end 232 of the piston 218 includes a non-magnetic spacer 234 that is substantially similar to the non-magnetic spacer 134 discussed above.

The first 222, second 224, and third 238 electromagnetic coils are alternately activated to generate respective magnetic fields to cause the piston 218 to move towards or away from the tool bit 210. The first 222, second 224, and third 238 electromagnetic coils are disposed around the sleeve 220 and the piston 218.

During operation (i.e., when the trigger 112 is actuated by the user) the second electromagnetic coil 224 is activated to cause the piston 218 to move away from the tool bit 210. Then the third 238 electromagnetic coil is activated to move the piston 218 to the furthermost position from the tool bit 210. The second electromagnetic coil 224 is again activated to cause the piston 218 to move towards the tool bit 210. When the piston 218 is close enough to the first electromagnetic coil 222, the first electromagnetic coil 222 is activated to cause the piston 218 to deliver an impact force to the tool bit 210. A controller (for example, controller 136 disposed in the handle portion 104) can control the activation of the electromagnetic coils in sequence using, for example, open loop control. For example, the sequence can be repeatedly implemented as follows: the second electromagnetic coil 224 is activated for t seconds, the third electromagnetic coil 238 is activated fort seconds, the second electromagnetic coil 224 is again activated for t seconds, and then the first electromagnetic coil 222 is activated for t seconds. In an embodiment, the third electromagnetic coil 238 is activated for more time than the first 222 and second 224 electromagnetic coils to allow the piston 218 to travel farther away from the tool bit 210 so that all three electromagnetic coils can add additional kinetic energy to the piston 218. In other words, when the user actuates trigger 112, the controller 136 repeatedly activates the second electromagnetic coil 224 for t seconds, the third electromagnetic coil 238 for 2*t seconds, the second electromagnetic coil 224 for another t seconds, and the first electromagnetic coil 222 for t seconds.

During operation of the tool 100, as a user applies a force to the tool 100 against a work piece/surface, the tool bit 110/210 is pushed inwardly towards the piston 118/218. When the trigger 112 is actuated by the user, the forcing 122 and returning 124 or the first 222, second 224, and third 238 electromagnetic coils are alternately activated by a controller (for example, controller 136 disposed in the handle portion 104, which may be a printed circuit board) to respectively generate opposing magnetic fields that drives the piston 118/218 in a reciprocating manner within the sleeve 120/220 to repeatedly deliver a force to the tool bit 110/210.

Accordingly, the present invention provides for an impact mechanism for a hammer tool that provides a powerful impact force without requiring compressed air. The impact mechanism can be powered by a rechargeable power source, such as, for example, a battery, while still providing sufficient impact force to chisel, cut, and shape metal and/or stone.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An impact mechanism for an impact tool having a housing, the impact mechanism comprising:

a piston slidably disposed in the housing;

a disk-shaped spacer composed of a non-magnetic material, wherein the disk-shaped spacer is disposed at an end of the piston and is adapted to transfer an impact force to a tool bit; and first and second electromagnetic coils disposed between the piston and the housing, wherein the first and second electromagnetic coils are alternately activated to generate respectiv magnetic fields, wherein the piston moves towards the tool bit when the first electromagnetic coil is activated, and the piston moves away from the tool bit when the second electromagnetic coil is activated.

2. The impact mechanism of claim 1, further comprising a sleeve disposed between the piston and the first and second electromagnetic coils.

3. The impact mechanism of claim 2, wherein the sleeve is made from a nylon composite material.

4. The impact mechanism of claim 1, wherein the housing includes an opening adapted to receive the tool bit.

5. The impact mechanism of claim 1, wherein the housing includes a threaded portion adapted to threadably couple with a tool bit holding mechanism.

6. The impact mechanism of claim 1, wherein the non-magnetic material includes titanium.

7. The impact mechanism of claim 1, wherein the piston has a piston outside diameter in a range of about 21 mm to 34 mm, the housing has a housing outside diameter is in a range of about 68 mm to 72 mm, and the first and second electromagnetic coils each has an inside diameter in a range of about 27 mm to 37 mm.

8. The impact mechanism of claim 7, wherein the piston outside diameter is about 33.19 mm, the housing outside diameter is about 72 mm, and the first and second electromagnetic coils inside diameters are about 37 mm.

9. An impact tool having a housing adapted to couple with a tool bit via a tool bit holding mechanism, the impact tool comprising:

an impact mechanism disposed in the housing and including:

an impact mechanism housing;

a piston slidably disposed in the impact mechanism housing;

a disk-shaped spacer composed of a non-magnetic material, wherein the disk-shaped spacer is disposed at an end of the piston and is adapted to transfer impact force to the tool bit; and first and second electromagnetic coils disposed between the piston and the impact mechanism housing, wherein the first and second electromagnetic coils are alternately activated to generate respective magnetic fields, wherein the piston moves towards the tool bit when the first electromagnetic coil is activated, and the piston moves away from the tool bit when the second electromagnetic coil is activated.

10. The impact tool of claim 9, wherein the impact mechanism further includes a sleeve disposed between the piston and the first and second electromagnetic coils.

11. The impact tool of claim 10, wherein the sleeve is composed of a synthetic thermoplastic polymer material.

12. The impact tool of claim 9, wherein the impact mechanism housing includes an opening adapted to receive the tool bit and a threaded portion adapted to threadably couple with a tool bit holding mechanism.

13. The impact tool of claim 9, wherein the non-magnetic material includes titanium.

14. The impact tool of claim 9, wherein the impact tool is powered by a battery.

15. The impact tool of claim 9, wherein the piston has a piston outside diameter in a range of about 21 mm to 34 mm, the impact mechanism housing has a housing outside diameter in a range of about 68 mm to 72 mm, and the first and second electromagnetic coils each has an inside diameter in a range of about 27 mm to 37 mm.

16. An impact hammer tool, comprising:

a housing adapted to couple with a tool bit via a tool bit holding mechanism; and an impact mechanism disposed in the housing and including:

an impact mechanism housing;

a nylon sleeve disposed in the impact mechanism housing;

a piston slidably disposed in the nylon sleeve and adapted to transfer impact force to the tool bit; and first and second electromagnetic coils disposed between the nylon sleeve and the impact mechanism housing, wherein the first and second electromagnetic coils are alternately activated to generate respective magnetic fields to cause the piston to respectively move in opposing first and second directions within the nylon sleeve.

17. The impact hammer tool of claim 16, wherein the piston includes a spacer composed of a non-magnetic material disposed at an end of the piston.

18. An impact mechanism for an impact tool with a housing, comprising:

a piston slidably disposed in the housing and adapted to transfer an impact force to a tool bit; and first, second, and third electromagnetic coils disposed between the piston and the housing, wherein the first, second, and third electromagnetic coils are alternately activated to generate respective magnetic fields to cause the piston to move, wherein activation of the first electromagnetic coil causes the piston to move towards the tool bit, and activation of the third electromagnetic coil causes the piston to move away from the tool bit.

19. The impact mechanism of claim 18, further comprising a sleeve disposed between the piston and the first, second, and third electromagnetic coils.

20. The impact mechanism of claim 19, wherein the sleeve is made from a nylon composite material.

21. The impact mechanism of claim 18, wherein the housing includes an opening adapted to receive the tool bit.

22. The impact mechanism of claim 18, wherein the housing includes a threaded portion adapted to threadably couple with a tool bit holding mechanism.

23. The impact mechanism of claim 18, wherein the piston includes a spacer composed of a non-magnetic material disposed at an end of the piston.

24. The impact mechanism of claim 23, wherein the non-magnetic material includes titanium.

25. The impact mechanism of claim 18, wherein the second electromagnetic coil is disposed between the first and third electromagnetic coils, and wherein the third electromagnetic coil is activated longer than the first and second electromagnetic coils during operation of the impact tool.

* * * * *